(12) United States Patent
Jian

(10) Patent No.: US 10,312,985 B2
(45) Date of Patent: Jun. 4, 2019

(54) SYSTEM AND METHOD FOR BEAMFORMING FOR WIRELESS STATIONS THAT HAVE FIXED LOCATIONS

(71) Applicant: HUAWEI TECHNOLOGIES CO., LTD., Shenzhen, Guangdong (CN)

(72) Inventor: Ming Jian, Kanata (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/624,925

(22) Filed: Jun. 16, 2017

(65) Prior Publication Data

US 2018/0367198 A1    Dec. 20, 2018

(51) Int. Cl.
| | |
|---|---|
| *H04B 7/0408* | (2017.01) |
| *H04B 7/06* | (2006.01) |
| *H01Q 3/42* | (2006.01) |
| *H04B 7/0417* | (2017.01) |
| *H04L 25/02* | (2006.01) |
| *H04L 25/03* | (2006.01) |

(52) U.S. Cl.
CPC .............. *H04B 7/0617* (2013.01); *H01Q 3/42* (2013.01); *H04B 7/0421* (2013.01); *H04B 7/0686* (2013.01); *H04L 25/0204* (2013.01); *H04L 2025/03426* (2013.01)

(58) Field of Classification Search
CPC ............................. H04B 7/0421; H04B 7/0617
See application file for complete search history.

(56) References Cited

U.S. PATENT DOCUMENTS

| | | | |
|---|---|---|---|
| 8,478,204 B2 | 7/2013 | Qin et al. | |
| 9,094,071 B2 | 7/2015 | Nandagopalan et al. | |
| 2004/0117076 A1* | 6/2004 | Horst | G05D 1/0282 |
| | | | 701/19 |
| 2008/0139137 A1 | 6/2008 | Guo et al. | |
| 2010/0103045 A1* | 4/2010 | Liu | H04B 7/0617 |
| | | | 342/372 |
| 2014/0269964 A1* | 9/2014 | Du | H04B 7/0452 |
| | | | 375/267 |
| 2015/0016341 A1* | 1/2015 | Trainin | H04W 16/28 |
| | | | 370/328 |
| 2016/0380685 A1* | 12/2016 | Kasher | H04B 7/0617 |
| | | | 370/329 |
| 2017/0127442 A1 | 5/2017 | Sun et al. | |

FOREIGN PATENT DOCUMENTS

GB          2533966 A        7/2016

OTHER PUBLICATIONS

International Search Report and Written Opinion for PCT/CN2018/088984 filed May 30, 2018; dated Aug. 21, 2018; 10 pages.

* cited by examiner

*Primary Examiner* — Tuan H Nguyen

(57) ABSTRACT

An apparatus includes an antenna, a memory and at least one processor. The memory stores data, which represents a beamforming profile for the antenna for wireless communication with a wireless station that has a fixed location. The processor(s), for a plurality of communication frames, configures the antenna based on the data for communications with the wireless station.

22 Claims, 9 Drawing Sheets

SYSTEM AND METHOD FOR BEAMFORMING FOR WIRELESS STATIONS THAT HAVE FIXED LOCATIONS

BACKGROUND

Wireless stations may benefit from wireless communications in the unlicensed 60 GigaHertz (GHz) frequency band, as the relatively large spectrum of this band allows for a data transmission rate as large as 7 Gigabits per second (Gbps). Due to the significant attenuation of high frequency wireless signals (e.g., signals in the 60 GHz band) caused by walls and other objects, wireless communications in the 60 GHz frequency band are typically transmitted and received in a highly directional manner. Advantageously, lower-power transceiver hardware may be used for directional communication, whereas much more powerful and costly omnidirectional transceivers would be required for omnidirectional communication.

A process called "beamforming" is typically used to achieve directional wireless communications between a pair of wireless stations (a mobile smartphone and a wireless access point, for example). In beamforming, transmit and receive stations directionally steer their antenna beams toward each other. In this manner, as a result of the beamforming process, each station may identify an antenna sector to be used by the station for communicating data with the other station.

SUMMARY

Wireless stations may communicate using superframes, or beacon intervals; and beamforming may consume a significant amount of overhead (i.e., time) of a given beacon interval. This overhead, in turn, reduces the portion of the beacon interval, which may be used for other purposes. According to aspects of the present disclosure, persistent-profile based beamforming is used in which a beamforming profile that is created or generated in a given beacon interval survives the given beacon interval and is reused in one or multiple subsequent beacon intervals. Advantages of the persistent-profile based beamforming may include one or more of the following. Beamforming-related overhead is reduced; the portion of a beacon interval that is otherwise used for beamforming may be repurposed; and data communication bandwidth may be increased.

According to an aspect of the present disclosure, there is provided an apparatus that includes an antenna; a memory; and at least one processor. The processor stores data that represents a beamforming profile for the antenna for wireless communication with a wireless station that has a fixed location. The processor(s), for a plurality of communication frames, configures the antenna based on the data for communications with the wireless station.

According to another aspect of the present disclosure, there is provided a method that includes, in a first communication frame, wirelessly communicating with a wireless station; and based on the wireless communication with the wireless station in the first communication frame, storing data in a memory representing a beamforming profile that is associated with the wireless station. The method includes, for a second communication frame, reading the data from the memory and configuring an antenna based on the beamforming profile that is represented by the data. The method includes communicating with the wireless station in the second communication frame using the antenna that is configured based on the beamforming profile.

According to a further aspect of the present disclosure, there is provided a non-transitory processor readable storage medium that stores instructions that, when executed by at least one processor, cause the processor(s) to wirelessly communicate data with a wireless station in a communication frame; and configure an antenna for the wireless communication in the communication frame based on beamforming information that is stored in a memory prior to commencement of the communication frame.

Optionally, in any of the preceding aspects, in another implementation, at least one processor may communicate with the wireless station to determine the beamforming profile.

Optionally, in any of the preceding aspects, in another implementation, the wireless station may be one of a plurality of wireless stations, and a given communication frame of a plurality of communication frames is associated with a parameter, which represents a number of wireless stations for which beamforming communications are performed within the given communication frame. The number is less than the number of the plurality of wireless stations.

Optionally, in any of the preceding aspects, in another implementation, a given communication frame is associated with a plurality of time division multiple access (TDMA) intervals. The TDMA intervals are associated with a plurality of wireless stations; and in response to detection of a degraded communication state associated with a given wireless station, a tracking package is transmitted in the TDMA interval that is associated with the given wireless station.

Optionally, in any of the preceding aspects, in another implementation, the beamforming profile is determined in response to a startup of the wireless station.

Optionally, in any of the preceding aspects, in another implementation, data that represents a state that controls use of the beamforming profile is set based on a communication history with the wireless station.

DETAILED DESCRIPTION

Figure 1:
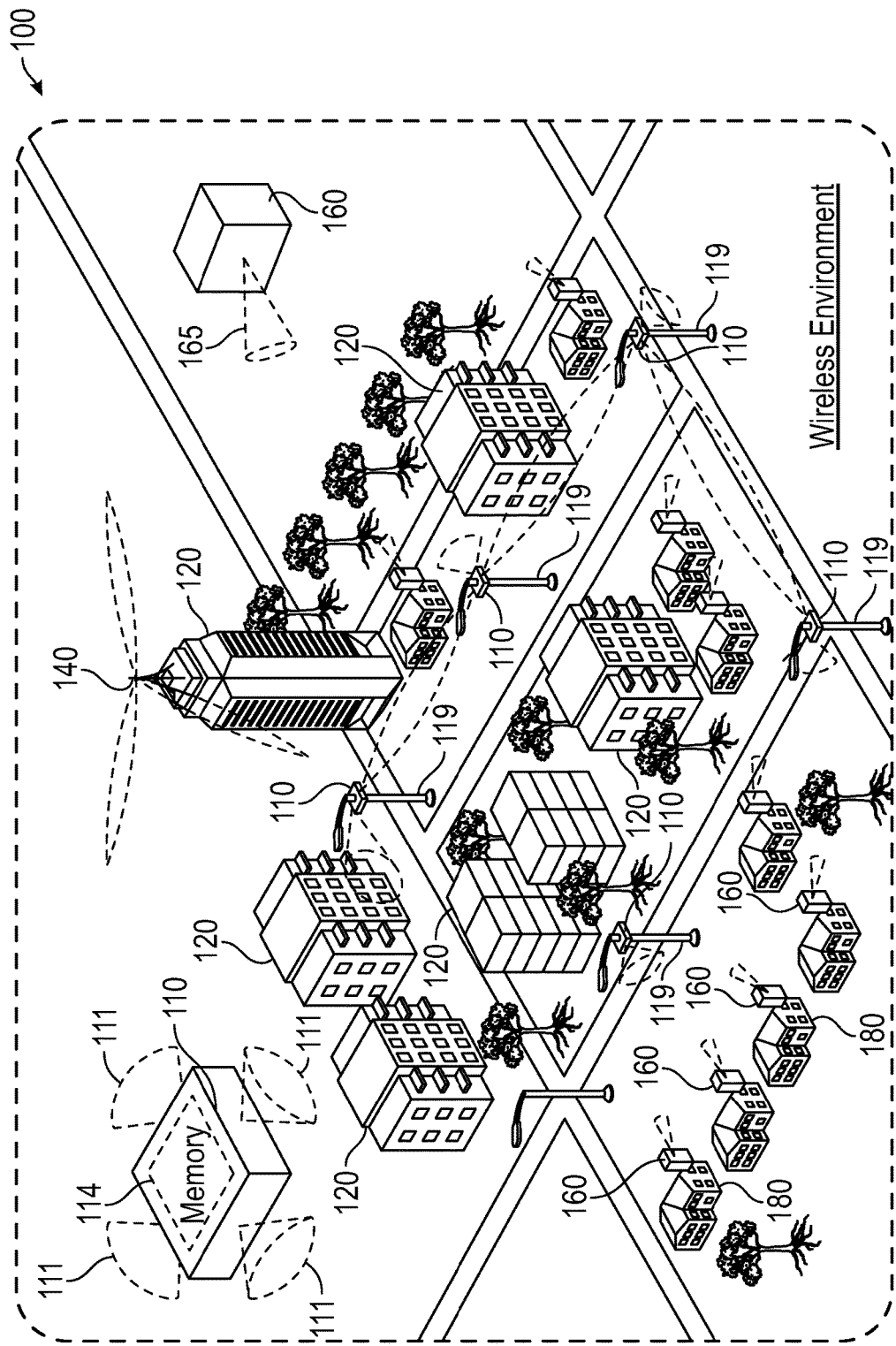
FIG. 1 is an illustration of a wireless communication environment according to an example implementation.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A given pair of wireless stations may communicate in a frequency band (the 60 GHz band, for example), which is highly directional. As such, the pair of wireless stations may employ "beamforming," which refers to a process to determine parameters representing how the antenna beams of the stations should be directed, or steered, for purposes of communicating data between the wireless stations. In this manner, a wireless station may have one or multiple antennas that may be controlled by the station to control the direction of an antenna gain pattern to steer a main lobe (the beam) of the antenna gain pattern in a particular direction (along a particular azimuth, for example). In general, beamforming may involve the wireless stations transmitting and receiving electromagnetic energy in a process that determines an optimum antenna beam direction for each wireless station for its subsequent data communications with the other station.

The wireless station may have one or multiple antennas, and each antenna may have one or multiple sectors. Selecting an antenna beam for a wireless station may involve identifying a particular antenna and identifying a particular sector of this particular antenna. For purposes of simplifying the following discussion, the beamforming process is discussed as way to select an antenna sector for each pair of wireless stations, with it being understood that for a wireless station having multiple antennas, the beamforming process results in a particular antenna (having the selected sector) of the wireless station also being selected or identified.

As an example, one of the wireless stations may be a wireless access point, which is a network component that allows other wireless stations (called "member wireless stations" herein) to access a wired network. In this manner, the member wireless stations may wirelessly communicate with the wireless access point using synchronized units of wireless communication called "super frames," or "beacon intervals." One part of the beacon interval may be dedicated to the beamforming process, and another part of the beacon interval may be dedicated to communicating data using antenna configurations that were determined using the beamforming process. The inclusion of beamforming in each beacon interval accommodates movements of the wireless stations relative to the wireless access point.

More specifically, the Institute of Electrical and Electronics Engineers (IEEE) 802.11ad specification (also referred to as the WiGig specification) sets forth a beamforming protocol for the 60 GHz frequency band for purposes of selecting antenna sectors for an initiator and a responder. As an example, a wireless access point is considered an "initiator" and the member wireless stations may be considered "responders." Beamforming between an initiator (wireless access point) and a member wireless station (a responder) may proceed as follows. In the initial part of a beacon interval, called a beacon transmit interval (BTI), the initiator transmits a transmit sector sweep (TXSS). In the TXSS, the initiator transmits a beacon using each of the sectors of the initiators antenna. For the TXSS, the responder configures its antenna in a quasi-omnidirectional antenna mode and listens for the transmitted beacons from the initiator. Each transmitted beacon contains data that identifies the sector identification (ID) associated with the transmission. Based on analysis of its received data, the responder may identify the best antenna sector of the initiator for communicating with the initiator.

Next, as part of the beamforming protocol, the beacon interval includes an associative beamforming training (A-BFT) interval in which the responder transmits a responder sector sweep (RSS). One way to perform an RSS is for the responder to transmit a beacon using each of the responders antenna sectors, and the initiator may then listen in a quasi-omnidirectional mode for purposes of determining the best antenna sector for the responder. Moreover, the transmitted beacons by the responder may contain data that represents the best sector ID determined in the ISS. Alternatively, the RSS may involve the responder transmitting repeated beacons in a quasi-omnidirectional antenna mode, and the initiator may listen for these transmissions in each of the initiator sectors in a receive sector sweep (RXSS). Regardless of how the RSS is performed, the best antenna sector of the responder, as determined by the initiator in the RSS, may then be communicated in sector sweep (SSW) feedback frame to the responder, and the responder may then acknowledge this frame. The beamforming process may further involve a beam refinement phase (BRP) in which parameters for the selected sectors are further optimized. Thus, at the conclusion of the beamforming process, the initiator, such as the wireless access point, as well as the responder, such as a member wireless station, have beamforming profiles, i.e., a set of parameters representing how the initiator and responder are to configure their respective antenna beams for purposes of communicating data with each other.

The foregoing process may consume a significant amount of overhead (i.e., time) of the beacon interval, especially for the case in which a wireless access point performs beamforming for multiple member wireless stations. This overhead, in turn, reduces the portion of the beacon interval, which may otherwise be available for data communications.

Systems and techniques are described herein for purposes of reducing the overhead that may otherwise be incurred for beamforming, thereby allocating more time in the beacon interval for data communication (or potentially for other purposes). More specifically, in accordance with example implementations, a wireless access point, which has a fixed location, may communicate with member wireless stations that also have fixed locations. For example, in accordance with some implementations, a wireless access point may be associated with a broadband Internet service provider, and the member wireless stations that communicate with the wireless access point may associated with stationary subscriber equipment. As a more specific example, the fixed location member wireless stations may be associated with subscribers to an Internet broadband service, and a given subscriber may be associated with a member wireless station that contains broadband reception equipment and an antenna that is attached to a structure (a building, a residence, and so forth).

As described herein, the wireless access point is constructed to take advantage of the fixed spatial relationships that the wireless access point has with respect to its associated member wireless stations.

In particular, in accordance with example implementations, the wireless access point may use persistent-profile based beamforming. In this context, "persistent-profile based beamforming" refers to the reuse of a beamforming profile in multiple beacon intervals, as opposed to, for example, creating the beamforming profile ad-hoc every the wireless access point communicates with a wireless station over a beacon interval. Thus, in accordance with example implementations, a given persistent beamforming profile survives the beacon interval in which the profile was created to be used again in one or multiple subsequent beacon intervals. In the context of this application, a "persistent" beamforming profile refers to a profile that does not change over time as well as a "semi-persistent" profile that survives the initial beacon interval in which the profile was created but eventually, may be updated and/or replaced by another beamforming profile.

As an example, the persistent-profile beamforming may involve a first wireless station accessing a stored beamforming profile for a second wireless station and using the beamforming profile for wireless data communications between the first and second wireless stations in one or multiple beacon intervals. As a further example, the beamforming profile may be created by the first wireless station or may be created by another entity. Moreover, the beamforming profile may be represented by data that is stored in a memory (a memory of the first wireless station or a memory that is not part of the first wireless station, for example). The memory may be a volatile memory or a non-volatile memory, depending on the particular implementation.

In accordance with example implementations, the wireless access point performs beamforming upon startup (upon the initial power up of the wireless access point, for example) to determine data that represents persistent beamforming profiles for its member wireless stations, and the wireless access point stores this data in a memory of the wireless access point. Thereafter, the wireless access point may, for a given beacon interval, read the data stored in the memory to retrieve the persistent beamforming profiles for a set of wireless stations and apply these beamforming profiles, all without consuming time in the beacon interval for beamforming-related communications with the wireless stations. Accordingly, more time may be allocated in the beacon interval for data communications with the wireless stations.

FIG. 1 depicts a wireless environment 100, in accordance with example implementations. In general, the wireless environment 100 may be used to supply relatively high speed fixed wireless broadband access, such as 60 GHz frequency band access, according to the IEEE 802.11ad specification. It is noted that frequency bands other than the 60 GHz frequency band may be used, in accordance with further example implementations. As depicted in FIG. 1, the wireless environment 100 may include point-to-multiple point (PTMP) technology in which PTMP wireless access points 110 may be wirelessly communication with a point-to-point (PTP) backhaul 140, which, in turn, may be coupled to a wired network.

The wireless access points 110 may be mounted to elevated structures (lamp posts 119 for the example implementation depicted in FIG. 1), and each wireless access point 110 may communicate with a set of one or multiple member wireless stations 160.

The wireless communications between the wireless access point 110 and its member wireless stations 160 may be physically constrained by various structures that may attenuate or block the wireless signals, such as buildings 120, trees and other objects. Beamforming, however, may be used for purposes of determining the antenna configurations for the wireless stations 160 and wireless access points 110 for their communications.

In accordance with example implementations, the wireless stations 160 may be fixed in location. In other words, as shown in FIG. 1, in accordance with example implementations, the wireless stations 160 may be, for example, fixed to structures, such as buildings 180, which means the spatial orientation between a given wireless station 160 and its associated wireless access point 110 may not change over time. Accordingly, in general, antenna configurations for a given wireless access point 110 and a given member wireless station 160, which result from the beamforming process, may not change over time.

As depicted in FIG. 1, in accordance with example implementations, a given wireless access point 110 may have an antenna coverage (as represented by cones 111) that spans approximately 360 degrees. This antenna coverage may be provided by one or multiple antennas of the wireless access point, and each antenna, in turn, may be associated with one or multiple sectors. Moreover, a given member wireless station 160 may have a more directional coverage (as represented by a cone 165), such as coverage of approximately 15 degrees (as an example), which may be provided by one or multiple antennas. Each antenna of the member wireless station 160 may be associated with one or multiple sectors. For a given wireless access point 110 and a given member wireless station 160, beamforming for this pair may correspondingly involve determining the best antenna sector for the wireless station and the best antenna/sector for the wireless access point for wireless communication of data between the wireless access point and the wireless station.

In accordance with example implementations, the wireless access point 110, when initially started up (when powered up for the first time or when reset to clear stored information, as examples), undergoes a sensing stage, in which the wireless access point 110 searches, or scans, for the member wireless stations 160 that are associated with the wireless access point 110. In this manner, as an example, the wireless access point 110 may access data, which describes a set of subscribers and corresponding IDs for the set of wireless member stations 160 that are associated with the subscribers. As part of the sensing stage, the wireless access point 110 scans, or searches, for its associated set of wireless stations 160 and communicates with each of these wireless stations 160 for purposes of performing beamforming to determine data that represents a persistent beamforming profile for each station 160.

In this manner, the persistent beamforming profile may represent an antenna/sector for the wireless access point 110 when communicating with the wireless station 160 as well as parameters (beam refinement protocol (BRP) parameters, for example), which further refine the parameters for the selected antenna/sector. In accordance with example implementations, the wireless access point 110 stores data representing the persistent beamforming profile in a memory 114 (a non-volatile memory, for example) of the wireless access point 110.

Thus, at the conclusion of the sensing stage, the memory 114 of the wireless access point 110 stores data, which represents persistent (or semi-persistent) beamforming profiles, where each profile represents an antenna configuration for the wireless access point 110 when communicating data with an associated wireless station 160. The wireless access point 110 may then, in accordance with example implementations, use these persistent beamforming profiles, in lieu of deriving these profiles via an ad-hoc beamforming process, in multiple, subsequent beacon intervals in which the wireless access point 110 communicates data with the member wireless stations 160. Accordingly, due to this persistent-profile based beamforming, time is not incurred in beacon intervals for beamforming, thereby allocating more time in the beacon intervals for communicating data with the member wireless stations 160.

Figure 2:
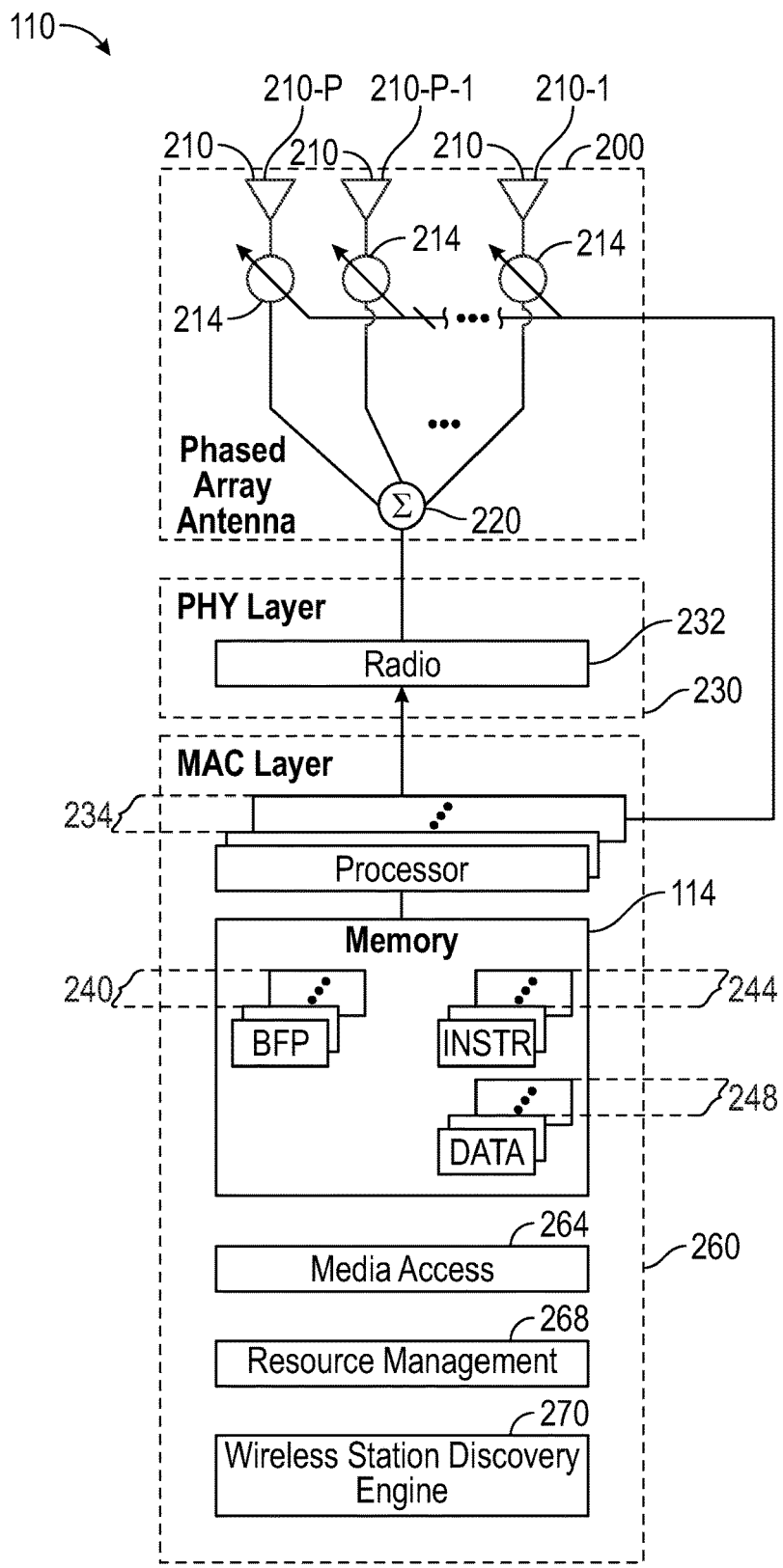
FIG. 2 is a schematic diagram of a wireless access point according to an example implementation.

Referring to FIG. 2, in accordance with example implementations, the wireless access point 110 includes one or multiple phase array antennas 200. In general, the phased array antenna 200 includes multiple antenna elements 210 (P antenna elements 210-1, . . . 201P-1, and 210-P, as depicted in the example of FIG. 2), with each antenna element 210 being coupled to an associated phase shifter 214. The signals received/transmitted via the antenna elements 210 are summed, or added together, via an adder 220. By controlling the phase shifts applied by the phase shifters 214, constructive and destructive interference may be used to control the antenna gain pattern for the phased array antenna 200. In accordance with example implementations, the phase shifts that are applied by the phase shifters 214 may be control to steer a beam associated with the phased array antenna 200 (control an azimuthal sector in which a main beam associated with a unidirectional antenna gain pattern for the antenna 200 appears, for example).

As depicted in FIG. 2, in accordance with example implementations, the phased antenna array 200 may be coupled to a physical layer 230 of the wireless access point 110, and more specifically, in accordance with example implementations, the phased array antenna 200 may be coupled to a radio. Moreover, the wireless access point 110 may include a media access control (MAC) layer 260, which includes one or multiple processors 234 that control operation of the radio 232. In this regard, by controlling operation of the radio 232 as well as controlling the phase shifters 214, the processor(s) 234 may steer an antenna beam to a selected antenna sector.

In accordance with example implementations, the processor 234 may include one or multiple central processing units (CPUs), one or multiple CPU processing cores, one or multiple microcontrollers, and so forth. Moreover, in accordance with further example implementations, the processor 234 may be a dedicated hardware circuit, such as a field programmable gate array (FPGA), an application specific integrated circuit (ASIC), and so forth.

As depicted in FIG. 2, the MAC layer 260 further includes the memory 114. The memory 114, in general, is a non-transitory storage medium, such as a storage medium that may include semiconductor storage devices, optical storage devices, magnetic storage devices, phase change memory devices, memristors, storage devices formed from one or more of these storage technologies, and so forth. Moreover, the memory 114 may be formed from a bank of memory devices, may be formed from multiple banks of memory devices, may be formed from memories that are connected by buses or other interconnects, and so forth.

The memory 114 stores data representing persistent beamforming profiles 240. In this regard, in accordance with some implementations, a given beamforming profile 240 is associated with a member wireless station 160 and may include a sector ID (or a combined antenna ID and sector ID) to be used for communications with the wireless station 160. The persistent beamforming profile 240 may also include one or more of the following: an ID linking the profile 240 to the associated wireless station 160; a count indicating a number of times in which a tracking package has been used (as further described herein) for the wireless station 160; beamforming refinement parameters; data representing a state of the persistent beamforming profile 240 (whether the profile 240 is active or inactive, whether the profile 240 is associated with a station 160 that has experienced failed or degraded communication); and so forth.

The memory 114 may store additional information other than the persistent beamforming profiles 240, such as, for example, data representing one or multiple machine executable instructions 244 (software or firmware, as examples), which may be executed by one or multiple processors 234 for purposes of causing the processor(s) 234 to perform one or more of the functions of the wireless access point 110, as described herein. More specifically, as described herein, instructions 244, when executed by one or multiple processors 234 may cause the processor(s) 234 to form components of the MAC layer 260, such as a wireless station discovery engine 270 that the wireless access point 110 uses to determine, update and apply the persistent beamforming profiles 240. Moreover, in accordance with example implementations, the memory 114 may store additional data 248, such as data pertaining to initial, intermediate and final parameters pertaining to beamforming or wireless communications, parameters associated with communications with the member wireless stations 160; data representing IDs for the member wireless stations 160; and so forth. In accordance with example implementations, the data 248 may be data representing message data to be transmitted to a particular wireless station, message data received from a particular wireless station, and so forth. In addition to the wireless station discovery engine 270, the MAC layer 260 may include a media access engine 264 and a resource management engine 268.

Figure 3A:
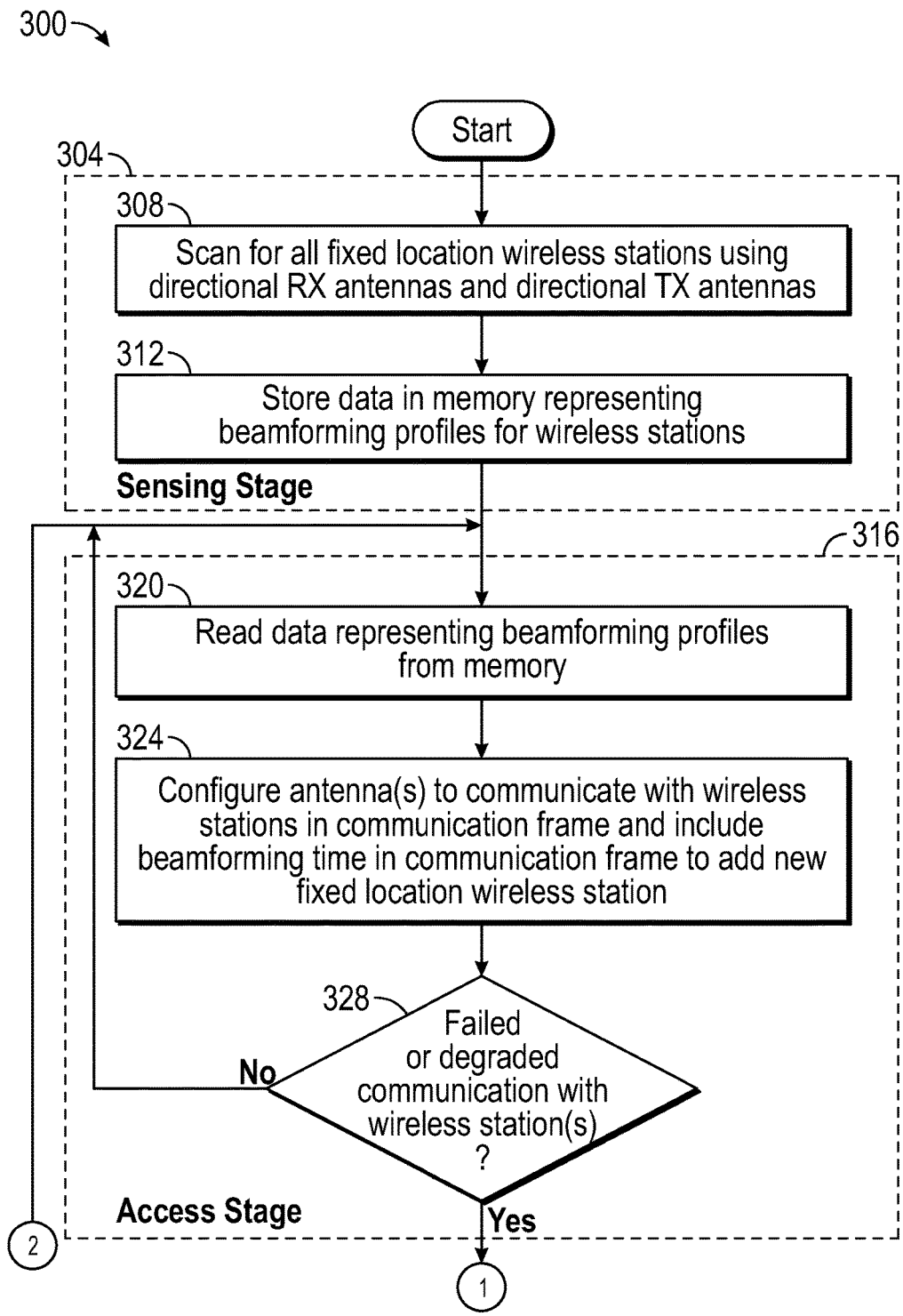
FIGS. 3A and 3B depict a flow diagram illustrating a technique in which persistent-profile based beamforming is used for wireless communications between fixed location-based wireless stations according to an example implementation.
Figure 3B:
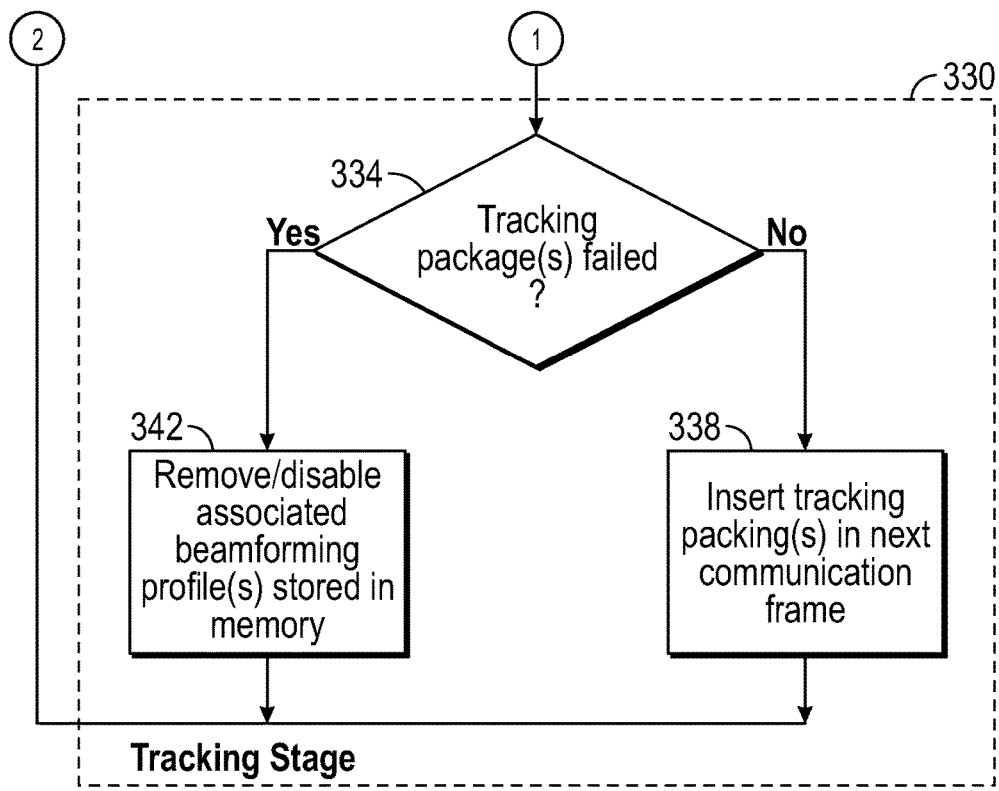

In accordance with example implementations, the wireless access point 110 may perform a technique 300 that is generally depicted in FIGS. 3A and 3B. In particular, FIGS. 3A and 3B depict three states, or stages, of the wireless access point 110 in accordance with example implementations: a sensing stage 304 in which the wireless access point 110 senses (i.e., detects, identifies, or determines) the member wireless stations 160 and determines the data to form the corresponding beamforming profiles 240 (FIG. 2) for the sensed wireless stations 160; an access stage 316 in which the wireless access point 110 uses the beamforming profiles 240 to configure the phased array antenna 200 for data communications with the member wireless stations 160; and a tracking stage 330 in which the wireless access point 110 performs a tracking function to determine whether a given wireless station 160 should be dropped, or omitted, from its associated set of stations due to degraded or failed wireless communication with the station 160.

More specifically, referring to FIG. 3A in conjunction with FIG. 2, in accordance with example implementations, the wireless station discovery engine 270 may enter the sensing stage 304 upon the initial startup of the wireless station 110. In this context, the "initial startup" of the wireless access point 110 refers to a state in which the wireless station 110 does not store persistent beamforming profiles 240 for the member wireless stations 160, due to the wireless access point 110 being powered up for the first time in the network, the wireless access point 110 being powered up after the memory 114 has been replaced; the wireless access point 110 being powered up or reset after the beamforming profiles 240 have been erased; and so forth.

In the sensing stage 304, the wireless station discovery engine 270 scans for the member wireless stations 160 that are associated with an associated set of subscribers for purposes of undergoing a beamforming process and determining the persistent beamforming profiles 240 for these stations 160. In this manner, pursuant to block 308, in accordance with example implementations, the wireless station beamforming engine 270 scans for all of its associated, fixed location wireless stations using its directional receive antennas and its directional transmit antennas. In this manner, in accordance with some implementations, the wireless station discovery engine 270 may cause the wireless access point 110 to use a transmit sector sweep (TXSS) in an initiator sector sweep (ISS) and use a receive sector sweep (RXSS) in the corresponding responder sector sweep (RSS). The result of the ISS and RSS as well as possibly a beam refinement phase provide beamforming information, or data, which the wireless station discovery engine 270 saves or stores, pursuant to block 312, in the memory 114 and which represents persistent beamforming profiles 240.

Thus, at the completion of the sensing stage 304, in accordance with example implementations, the memory 114 stores data representing a persistent beamforming profile 240 for each of the detected member wireless stations 160 that are associated with subscribers that are assigned to the wireless access point 110. It is noted that in accordance with example implementations, the wireless station discovery engine 270 may not be successful in communicating with one or more of its associated member wireless stations 160. As examples, failure to detect a member wireless station 160 may be the result of a particular subscriber not setting up the subscriber's equipment, equipment failure, blockage of the antenna of the wireless station, and so forth.

When the wireless station discovery engine 270 is unsuccessful in communicating with a given wireless station in the sensing stage 304 then, in accordance with example implementations, the wireless station discovery engine 270 sets state data to represent the failure. In this manner, in accordance with example implementations, the persistent beamforming profile 240 (FIG. 2) may contain state data that controls the use of the profile 240. In this manner, the state data may, for example, represent whether the profile 240 is active, inactive (associated with a wireless station ID no longer used, for example), or is currently associated with a tracking process to reestablish communication with the associated wireless station 160.

Still referring to FIG. 3A, after detecting the member wireless stations 160 and determining the persistent beamforming profiles 240 in the access stage 304, the wireless access point 110 may then enter the access stage 316 for purposes of communicating data with the member wireless stations 160. In this manner, the media access engine 260, resource management engine 268 and wireless station discovery engine 270 may cooperate in the access stage 316 to first read (block 320) data representing the persistent beamforming profiles 240 for the wireless stations 160 from the memory 114. The retrieved beamforming profiles 240 may then be used, pursuant to block 324, to configure the antenna(s) of the wireless access point 110 to communicate with the member wireless stations 160 in a communication frame.

Moreover, as depicted in FIG. 3A, in accordance with example implementations, the communication frame may include a beamforming period to allow a new fixed location wireless station to be added. In this regard, the provision of the beamforming period in the communication frame may allow a wireless station whose beamforming profile is not yet stored in the memory (or a station that has been deactivated and rediscovered, for example) to be added; and when this occurs, the wireless station discovery engine 270 may detect and determine the corresponding beamforming profile, as described herein. This may be the case, for example, when a new subscriber is added; a subscriber who previously had a problem that resulted in communication with the associated wireless station being lost is re-added; failed subscriber equipment has been replaced; an obstruction (a tree, for example) caused a persistent beamforming profile 240 for a wireless station 160 to be deactivated; and so forth.

In the access stage 316, the media access engine 260 may determine (decision block 328) whether failed or degraded communication has occurred with one or multiple member wireless stations 160. If not, the communication in the communication frame was successful and control returns to block 320 so that another communication frame may begin. If, however, failed or degraded communication occurred, control may transfer to the tracking stage 330 of the wireless access point 110, which is depicted in FIG. 3B.

Referring to FIG. 3B in conjunction with FIG. 2, in accordance with example implementations, in the tracking stage 330, the media access engine 260 may, in conjunction with the wireless station discovery engine 270, determine (decision block 334) whether one or more previous tracking packages have failed. In this manner, in general, the media access engine 260 may insert a media tracking package for an affected member wireless station 160 for which communication has failed or which is associated with a degraded communication, for purposes of "pinging" the wireless station. Multiple pinging attempts may be attempted by the wireless access point 110, in accordance with example implementations.

In this manner, in accordance with some implementations, the wireless access point 110 may attempt to transmit a predetermined number of tracking packages to a wireless station 160 in a corresponding number of beacon intervals. The tracking packages may or may not be successful. The tracking packages may be successful for cases in which communication is momentarily lost due to, as examples, an intermittent power failure of the wireless station, momentary blocking of the wireless station's antenna (by a vehicle, for example), and so forth. Therefore, if a determination is made in decision block 334 that a predetermined number of tracking packages have been submitted, then, pursuant to block 342, the associated persistent beamforming profile is removed or disabled from the memory 114 (by setting the state data of the beamforming profile 240, for example) and control returns back to the access stage 316. In other words, with the removal/disablement of the associated persistent beamforming profile, tracking packages are no longer used in an attempt to communicate with the wireless station. If, however, pursuant to decision block 334, the tracking packages have not yet exceeded a predetermined number, then another tracking package is inserted into the next communication frame for the affected wireless station, pursuant to block 338. The number of tracking attempts for a given wireless station 160 may be representing by state data of the associated persistent beamforming profile 240, in accordance with example implementations.

Figure 4:
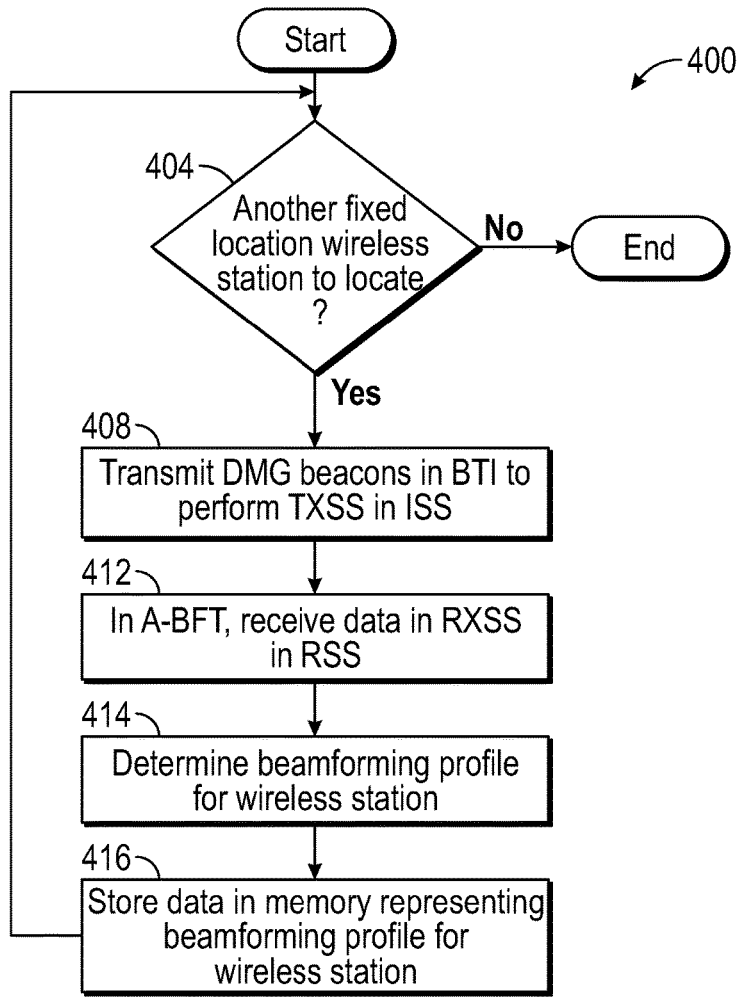
FIG. 4 is a flow diagram depicting a technique performed by a wireless access point at startup according to an example implementation.
Figure 5:
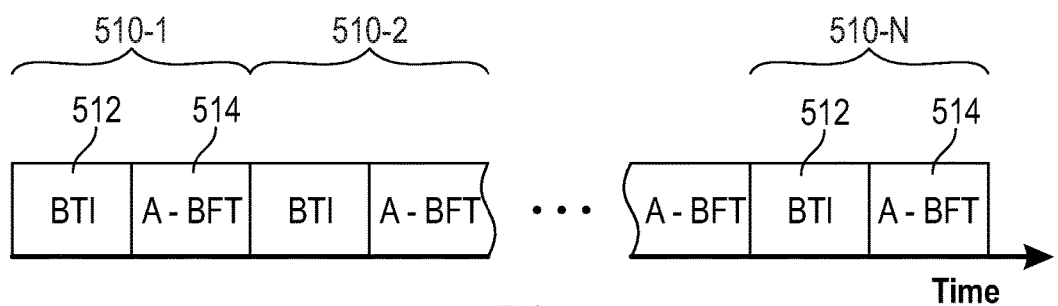
FIG. 5 is an illustration of beacon intervals used by a wireless access point at startup point to determine beamforming profiles for wireless stations according to an example implementation.

In accordance with example implementations, the wireless access point 110 may communicate with the wireless stations using a protocol that complies with the IEEE 802.11ad specification. For these example implementations, the wireless station discovery engine 270 (FIG. 2) may use a technique 400 that is depicted in FIG. 4 and beacon intervals 510 (N beacon intervals 510-1, 510-2, . . . 510-N, being depicted as examples in FIG. 5) for purposes of sensing, or detecting, the member wireless stations 160 upon initial startup of the wireless access point 110. In this manner, referring to FIGS. 4 and 5 in conjunction with FIG. 2, the wireless station discovery engine 270 may, in accordance with example implementations, use multiple, successive beacon intervals 510 for determining the persistent beamforming profiles 240 for the associated wireless stations. In this regard, as depicted in FIG. 5, in accordance with some implementations, each beacon interval 510 may include a beacon time interval (BTI) 512 followed by an associative beamforming training (A-BFT) interval 514. Each beacon interval 510, in accordance with example implementations, is used to determine a persistent beamforming profile 240 for an associated member wireless station 160.

The BTI 512 represents a time interval in which the wireless access point 110 transmits a digital multiple bit (DMG) beacon in each antenna sector in a TXSS in the ISS for purposes of selecting the antenna sector for the wireless access point 110. In an associated A-BFT interval 514, the wireless access point 110 may use an RXSS for purposes of selecting the antenna sector for the wireless station 160. Moreover, in accordance with example implementations, the A-BFT interval 514 may include communications as part of a beam refinement phase (BRP) for purposes of further refining the parameters for the beamforming.

More specifically, referring to FIG. 4 in conjunction with FIG. 2, the wireless station discovery engine 270 may, pursuant to technique 400, determine (decision block 404) whether there is another fixed location wireless station 160 to locate and if so, the wireless station discovery engine 270 may cause the wireless access point 110 to transmit (block 408) the DMG beacons in a BTI to perform a TXSS in ISS and then, in the A-BFT, receive data in an RXSS in a RSS pursuant to block 412. The wireless station discovery engine 270 may then cause the wireless access point 110 to determine the corresponding persistent beamforming profile 240 for the wireless station 160 and save (block 416) the corresponding data representing the persistent beamforming profile 240 in the memory 114.

Figure 6:
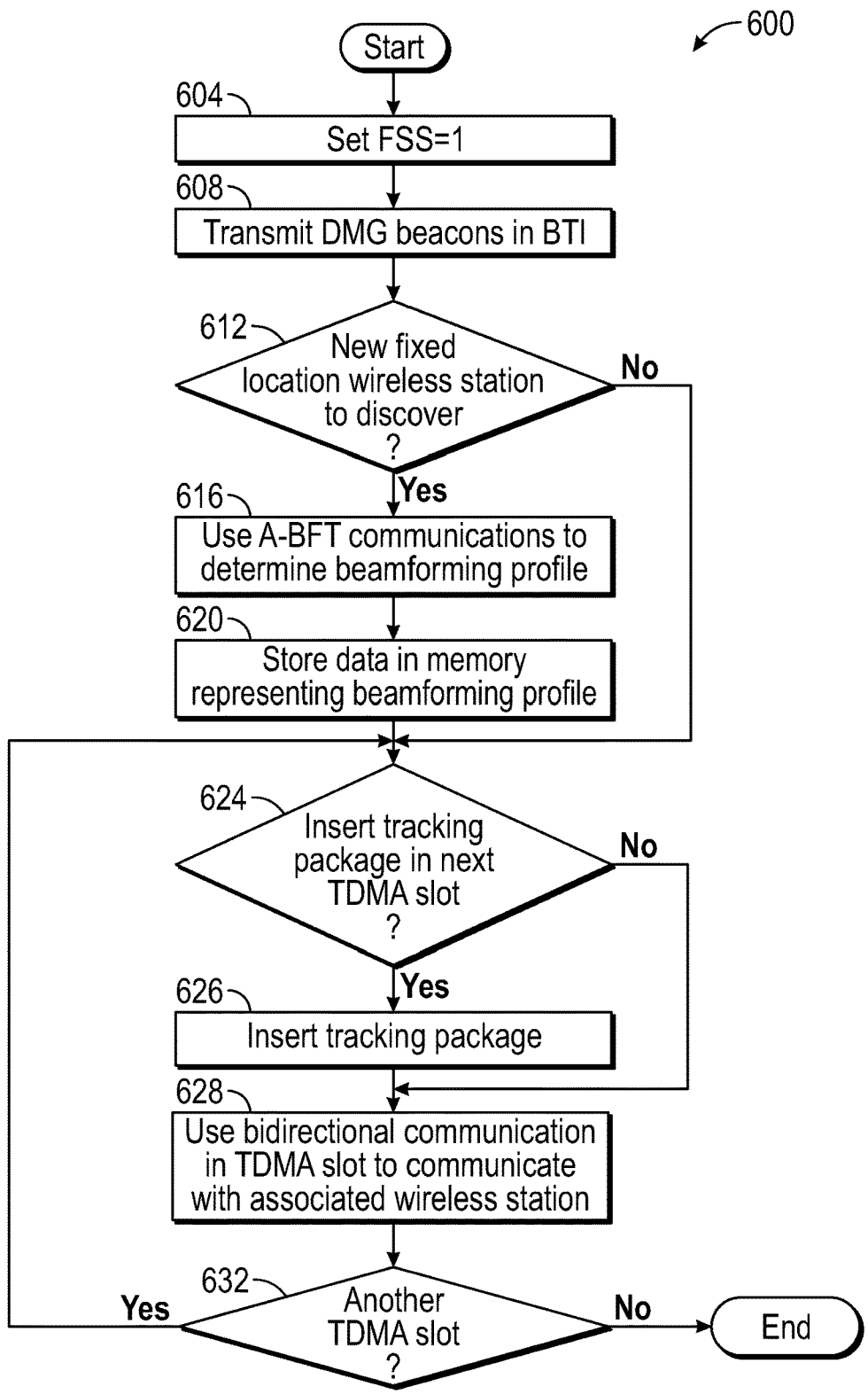
FIG. 6 is a flow diagram depicting a technique performed by a wireless access point to communicate data with fixed location-based wireless stations according to an example implementation.
Figure 7:
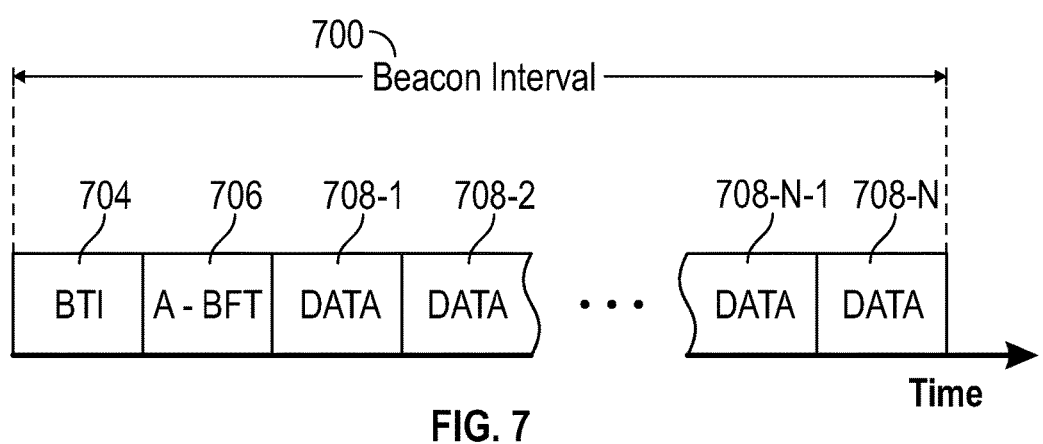
FIGS. 7 and 9 are illustrations of beacon intervals illustrating time division multiple access (TDMA)-based data communications between a wireless access point and multiple wireless stations according to example implementations.

FIG. 6 depicts a technique 600 that may be used by the wireless access point 110 for the access stage in the wireless access point 110 communicates data using the persistent-profile based beamforming. In particular, the wireless access point 110 may use, for this purpose, a beacon interval 700 that is depicted in FIG. 7. In accordance with example implementations, for the beacon interval 700, both a BTI 704 and an A-BFT 706 are configured to have corresponding durations that are the minimums allowed by the IEEE 802.11ad specification for the beacon interval 700.

For example, in accordance with some implementations, the A-BFT 706 has a duration set by a parameter called "FSS." In accordance with example implementations, "FSS=1" allows the discovery of beamforming information for one wireless station 160. In this manner, in accordance with example implementations, the A-BFT 706 allows a new wireless station to be discovered and the associated beamforming information to be determined as well as allows beamforming information and discovery of a wireless station that has previously been offline and removed from the beamforming profiles. The remaining beamforming profiles used for the beacon interval 700, in turn, may be retrieved from the memory 114 of the wireless access point 110.

FIG. 7 also depicts time division multiple access (TDMA)-based data communications for the wireless stations involved with the beacon interval 700. In this regard, in accordance with some implementations, each wireless station 160 involved in data communications in the beacon interval 700 has an associated timeslot in which bidirectional communications occur between the station 160 and the wireless access point. In this regard, one wireless station may be assigned an associated TDMA time slot 708-1, another wireless station may be assigned TDMA time slot 708-2, and so forth. In each time slot 708, in turn, the wireless access point 110 and the corresponding wireless station 160 may bi-directionally communicate such that uplink and downlink data may be communicated to and from the wireless access point 110. More specifically, referring to FIGS. 6 and 7 in conjunction with FIG. 2, in accordance with some implementations, in a given beacon interval 700, the wireless access point 110 may set (block 604) the FSS parameter to "1" to set the corresponding A-BFT interval to the minimum value and transmit (block 608) the DMG beacons in the BTI. Next, pursuant to technique 600, the wireless access point 110 determines (decision block 612) whether there is a new fixed location wireless station 160 to discover. If so, the wireless access point 110 uses (block 616) the A-BFT interval to determine the persistent beamforming profile for this station and store (block 620) the corresponding data in the memory for the persistent beamforming profile.

Next, pursuant to the technique 600, the wireless access terminal 110 determines (decision block 624) whether a tracking package should be inserted into one or more TDMA timeslots. In this regard, the timeslot for a given wireless station may not be used for purposes of communicating data with the station but rather, may be used for purposes of "pinging" the station, and if so, the wireless access point 110 inserts (block 626) the tracking package into the associated TDMA slot. Next, pursuant to technique 600, the wireless access point 110 may use (block 628) bi-directional communication in the TDMA slot to communicate with the associated wireless station, and if a determination is made (decision block 632) that another TDMA slot is to be included in the current beacon interval, control returns to decision block 624 to process the data for the next TDMA slot.

Figure 8:
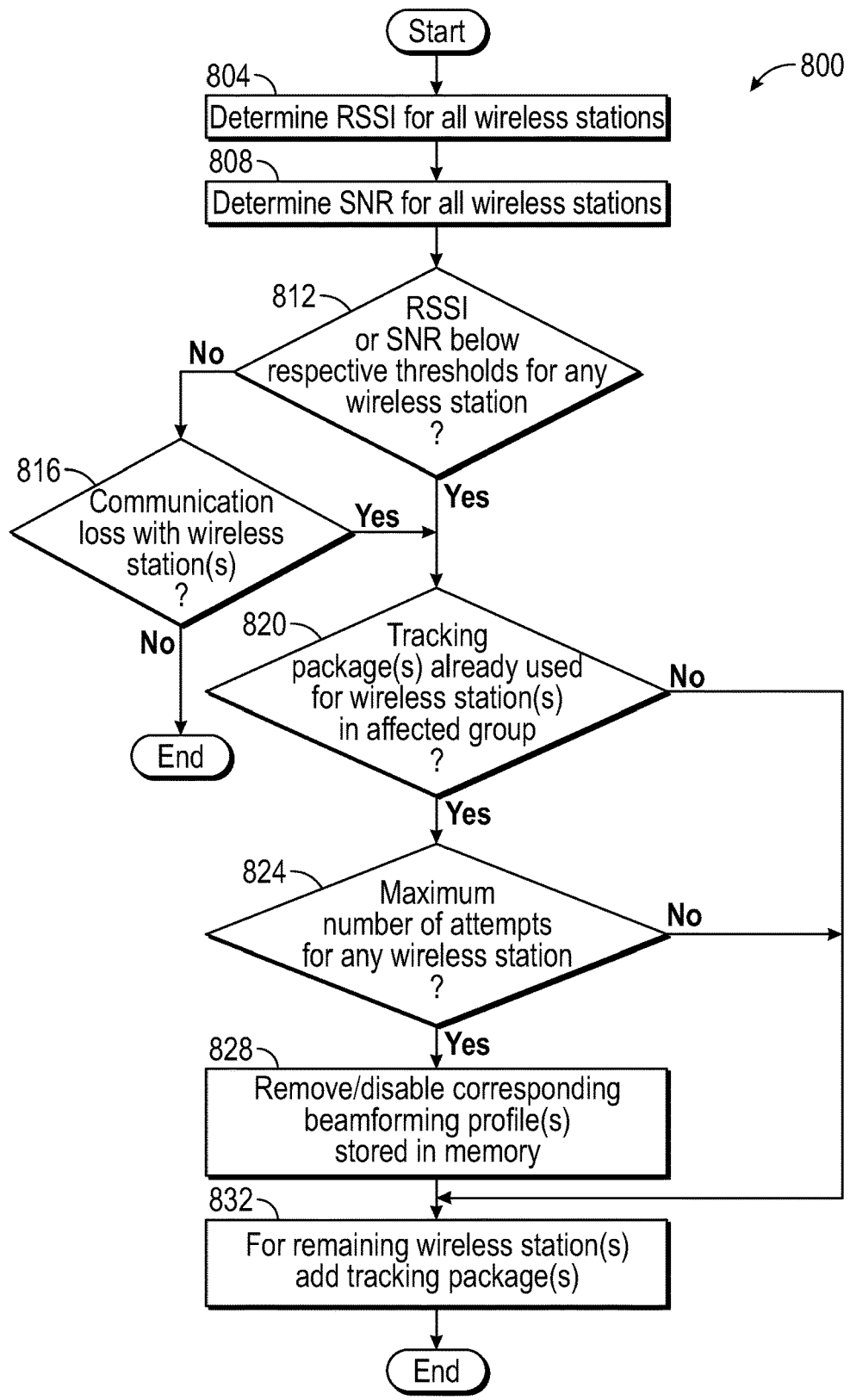
FIG. 8 is a flow diagram depicting tracking of a wireless station by a wireless access point according to an example implementation.
Figure 9:
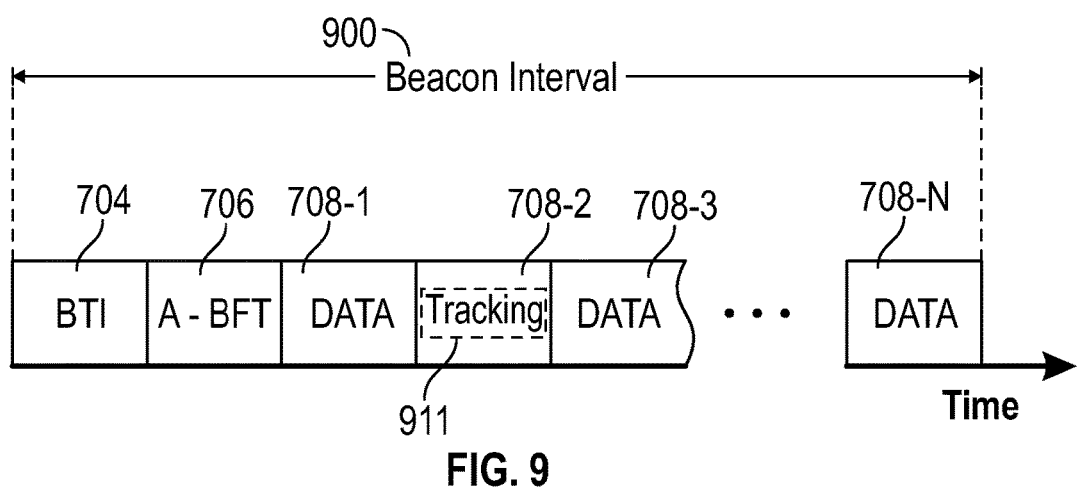

Referring to FIG. 8, in accordance with some implementations, the wireless access point 110 may use a technique 800 and a beacon interval 900 for purposes of pinging, or tracking a particular wireless station that has a degraded communication or lost communication. In this manner, the beacon interval 900 of FIG. 9 is the same as the beacon interval 700 of FIG. 7, with like reference numerals being used to denote similar components. However, unlike the beacon interval 700, TDMA slot 708-2 is used to insert a tracking package 911 for a corresponding wireless station 160 for which communication has been lost or for which communication has degraded below an acceptable level. The technique 800 may be executed periodically by the wireless access point 110, may be executed for each beacon interval during the access stage, may be executed in parallel with the access stage, and so forth, depending on the particular implementation.

Referring to FIGS. 8 and 9 in conjunction with FIG. 2, pursuant to the technique 800, the wireless access point 110 determines (block 804) a received signal strength indicator (RSSI) for all of the wireless stations 160 associated with the wireless access point 110 and determines (block 808) the signal-to-noise ratio (SNR) for the wireless stations 160. If the wireless access point determines (decision block 812) that the RSSI or the SNR for any wireless station 160 is below a respective threshold, indicating degraded or lost communication with the wireless station 16, then the wireless access point 110 proceeds to decision block 820 beginning a process to insert a tracking package. It is noted that if the RSSI and SNR are acceptable for all of the wireless stations 160, then the wireless access point 110 may further check (decision block 816) whether communication with a particular wireless station has been lost, and if so, control may also proceed to decision block 820.

In decision block 820, the wireless access point 110 determines whether a tracking package has already been used for the particular wireless station in which communication has been degraded, and if not, control proceeds to block 832 in which the wireless access point adds the tracking package. Otherwise, if the tracking package has previously been used for this particular wireless station, the wireless access point determines (decision block 824) whether a maximum number of attempts have occurred for this particular station. For example, in accordance with some implementations, the wireless access point 110 may attempt a predetermined number of times (and a corresponding number of beacon intervals) to communicate with a particular wireless station, and eventually, upon determining that the maximum number has been reached, the wireless access point may remove or disable the corresponding beam forming profile from the memory, pursuant to block 828.

Other implementations are contemplated, which are within the scope of the appended claims. For example, in accordance with further implementations, a wireless station other than a wireless access point may use persistent-profile based beamforming. As a more specific example, a wireless station 160 may determine a persistent beamforming profile and store data representing the persistent beamforming profile in a memory of the wireless station 160. The wireless station 160 may read the data from its memory and use the persistent beamforming profile to configure an antenna of the wireless station 160 for communications with the wireless access point 110.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. An apparatus comprising:
    an antenna;
    a memory to store data representing a beamforming profile for the antenna for wireless communication with a wireless station having a fixed location; and
    at least one processor to, for each beacon interval of a plurality of beacon intervals for wireless communications with the wireless station:
        reuse the beamforming profile represented by the data stored in the memory to configure the antenna based on the data, and
        bypass performing beamforming training for the communications with the wireless station.

2. The apparatus of claim 1, wherein the at least one processor is configured to, in a beacon interval other than the plurality of beacon intervals, communicate with the wireless station to determine the beamforming profile.

3. The apparatus of claim 1, wherein:
    the wireless station comprises one of a plurality of wireless stations; and
    the memory is configured to store data representing beamforming profiles for the plurality of wireless stations.

4. The apparatus of claim 3, wherein:
    a given beacon interval of the plurality of beacon intervals is associated with a parameter representing a number of wireless stations for which beamforming communications are performed within the given beacon interval; and
    the number is less than the number of the plurality of wireless stations.

5. The apparatus of claim 4, wherein the parameter represents one wireless station for which beamforming communications are performed with the given beacon interval.

6. The apparatus of claim 3, wherein:
    a given beacon interval of the plurality of beacon intervals is associated with a plurality of time division multiplex access (TDMA) intervals;
    the TDMA intervals are associated with a set of wireless stations of the plurality of wireless stations; and
    the at least one processor communicates with the wireless stations using the associated TDMA intervals in the given beacon interval.

7. The apparatus of claim 3, wherein:
    a given beacon interval of the plurality of beacon intervals is associated with a plurality of time division multiplex access (TDMA) intervals;
    the TDMA intervals are associated with a set of wireless stations of the plurality of wireless stations; and
    in response to detection of a degraded communication associated with a given wireless station of the set of wireless stations, the at least one processor to communicate with the given wireless station in the TDMA interval associated with the given wireless station.

8. The apparatus of claim 7, wherein the at least one processor to detect the degraded communication based on at least one of a signal to noise ratio, a received signal strength indicator, or whether communication with the given wireless station has failed.

9. The apparatus of claim 3, wherein:
    the at least one processor is associated with a wireless access point;
    in response to a startup of the wireless access point, the at least one processor to communicate with the wireless station in a super frame; and
    the super frame comprises, for each wireless station of the plurality of wireless stations:
        a first interval for beacon transmissions associated with sectors of the antenna; and
        a second interval for communications between the wireless access point and the wireless station to determine the beamforming profile for the wireless station.

10. The apparatus of claim 1, wherein the communications with the wireless station comprise non-beamforming-related communications.

11. A method comprising:
    in a first beacon interval, wireless communicating with a wireless station;
    storing data in a memory representing a beamforming profile associated with the wireless station based on the wireless communication with the wireless station in the first beacon interval; and
    based on the beamforming profile represented by the data, for a second beacon interval, reading the data from the memory and configuring an antenna based on the beamforming profile represented by the data; and performing non-beamforming-related communication with the wireless station in the second beacon interval using the antenna configured based on the beamforming profile.

12. The method of claim 11, wherein reading the data comprises reading the data from the memory during the second beacon interval.

13. The method of claim 11, further comprising:
in the first beacon interval, wirelessly communicating with another wireless station; and
storing data in the memory representing a beamforming profile associated with the another wireless station.

14. The method of claim 13, further comprising:
communicating with the another wireless station in the second beacon interval using the antenna configured based on the beamforming profile associated with the another wireless station.

15. The method of claim 11, wherein the wireless station is one of a plurality of wireless stations, the second communication comprises a time interval associated with beamforming and having a duration associated with a number of wireless stations for which beamforming is to be performed in the time interval, the method further comprising:
communicating with the plurality of wireless stations in the second beacon interval, wherein the number of stations of the plurality of wireless stations is greater than the number of wireless stations associated with the duration of the time interval associated with beamforming.

16. The method of claim 11, wherein the first beacon interval comprises a first superframe and the second beacon interval comprises a second superframe other than the first superframe.

17. A non-transitory machine-readable storage medium storing instructions that, when executed by at least one processor, cause the at least one processor to:
wirelessly communicate data with a wireless station of a plurality of wireless stations in a beacon interval, wherein the beacon interval is associated with a parameter representing a number of wireless stations for which beamforming communications are performed within the beacon interval, and the number is less than the number of the plurality of wireless stations;
store data in a memory prior to commencement of the beacon interval, wherein the data represents beamforming profiles for the plurality of wireless stations; and
bypass beamforming training in the beacon interval, wherein bypassing the beamforming training includes configuring an antenna for the wireless communication in the beacon interval based on the data.

18. The non-transitory machine-readable storage medium of claim 17, wherein the storage medium stores instructions that when executed by the at least one processor cause the at least one processor to:
wirelessly communicate with the wireless station of the plurality of wireless stations in another beacon interval;
determine the beamforming data based on the wireless communication with the wireless station of the plurality of wireless stations in the another beacon interval.

19. The non-transitory machine-readable storage medium of claim 17, wherein the storage medium stores instructions that when executed by the at least one processor cause the at least one processor to determine the beamforming profile in response to a startup of a wireless station of the plurality of wireless stations containing the at least one processor.

20. The non-transitory machine-readable storage medium of claim 17, wherein the storage medium stores instructions that when executed by the at least one processor cause the at least one processor to set data that represents a state that controls use of the beamforming profile based on a communication history with the wireless station of the plurality of wireless stations.

21. The non-transitory machine-readable storage medium of claim 17, wherein the storage medium stores instructions that when executed by the at least one processor cause the at least one processor to set the state of the data based on a number of beacon intervals in which communication with the wireless station failed of the plurality of wireless stations.

22. The non-transitory machine-readable storage medium of claim 17, wherein the beacon interval comprises a beacon transmit interval (BTI) associated with an initial part of the beacon interval.

* * * * *